United States Patent [19]

Bergmann et al.

[11] Patent Number: 4,651,207
[45] Date of Patent: Mar. 17, 1987

[54] MOTION ADAPTIVE INTERPOLATION OF TELEVISION IMAGE SEQUENCES

[75] Inventors: Hans C. Bergmann, Neu-Isenburg; Hans-Georg Musmann, Salzgitter-Bad, both of Fed. Rep. of Germany

[73] Assignee: ANT Nachrichtentechnik GmbH, Backnang, Fed. Rep. of Germany

[21] Appl. No.: 708,458

[22] Filed: Mar. 5, 1985

[30] Foreign Application Priority Data

Mar. 5, 1984 [DE] Fed. Rep. of Germany ....... 3408061

[51] Int. Cl.$^4$ .......................... H04N 7/12; H04N 7/18
[52] U.S. Cl. ..................................... 358/136; 358/133; 358/105
[58] Field of Search ............... 358/105, 133, 135, 136; 364/518, 521

[56] References Cited

U.S. PATENT DOCUMENTS

| 4,383,272 | 5/1983 | Netravali et al. | 358/136 |
| 4,494,140 | 1/1985 | Michael | 358/136 |
| 4,496,972 | 1/1985 | Lippmann et al. | 358/136 X |
| 4,597,010 | 6/1986 | Carr | 358/136 |

Primary Examiner—E. A. Goldberg
Assistant Examiner—Patrick W. Foster
Attorney, Agent, or Firm—Spencer & Frank

[57] ABSTRACT

In order to effect motion adaptive interpolation of nontransmitted television image sequences, each based on at least two transmitted television image sequences, the transmitted sequences are received and segmentally divided into stationary and moving components, and the displacement of the moving components is determined by picture elements. These operations are carried out by electronically segmentally dividing each sequence into background regions which are to become visible and background regions which are to become hidden due to the movement of each moving component and deriving characteristic segment information having four possible values; deriving a set of filter coefficients from the character segment information and from information obtained as a result of determining displacement; and applying the filter coefficients to a motion adaptive interpolation filter for causing the filter to generate the nontransmitted image sequences.

8 Claims, 8 Drawing Figures

| SEGMENT INFORMATION TERMS | COEFFICIENTS | INTERPOLATOR OUTPUT SIGNAL |
|---|---|---|
| $b_1$ | $a_k = a_{k-2} = \frac{1}{2}$ | $\frac{1}{2} \cdot I_{k-2}(x - \frac{dx}{2}, y - \frac{dy}{2}) + \frac{1}{2} \cdot I_k(x + \frac{dx}{2}, y + \frac{dy}{2})$ |
| $b_2$ | $dx = dy = 0$<br>$a_k = 1, a_{k-2} = 0$ | $1 \cdot I_k(x,y)$ |
| $b_3$ | $dx = dy = 0$<br>$a_k = 0, a_{k-2} = 1$ | $1 \cdot I_{k-2}(x,y)$ |
| $b_4$ | $dx = dy = 0$<br>$a_k = a_{k-2} = \frac{1}{2}$ | $\frac{1}{2} \cdot I_{k-2}(x,y) + \frac{1}{2} \cdot I_k(x,y)$ |

MOTION ADAPTIVE INTERPOLATION OF TELEVISION IMAGE SEQUENCES

BACKGROUND OF THE INVENTION

The present invention relates to a method for the motion adaptive interpolation of nontransmitted television image sequences formed from at least two transmitted sequences, and to uses for this method. A method of this type is described by Netravali and Robbins in "Motion Adaptive Interpolation of Television Frames"; and by Bergmann in "Motion Adaptive Interpolation of Eliminated TV Fields", both published in Proc. of the Picture Coding Symposium, 1981, Montreal, Canada.

Several proposals have been published for the reduction of the transmission rate of digital television image sequences. These proposals primarily involve the elimination of individual television image sequences, i.e. television fields or frames, at the transmitting end and image interpolation at the receiving end, as described by Netravali et al and Bergmann, supra, as well as by Klie in "Codierung von Fernsehsignalen füniedrige Übertragungsbitraten" [Coding of Television Signals For Low Transmission Bit Rate], Dissertation, 1978, University of Hannover.

Klie describes a relatively simple interpolation method. The luminance values of picture elements, i.e. pixels, within the eliminated frames are obtained from the corresponding pixels in the transmitted frames. The drawback of this method is that it achieves inadequate reconstruction of moving image portions. A purely linear interpolation leads to smudged contours in the case of slow movements. For fast movements, this type of interpolation leads to multiple displays of the moving image portions resulting in motion reconstruction which appears jerky in the image sequence.

To improve these inadequacies, adaptive interpolation methods have been developed, also described by Netravali et al and Bergmann, supra. Here, the television image to be reconstructed is divided by means of a segmentizer into stationary image and nonstationary image regions. Then each pixel within a nonstationary image region is fed to a displacement estimator to obtain a reference value of the amount of movement. For luminance signal interpolation in the nonstationary image regions, the correspondingly offset pixels from the transmitted images can be used. By means of this interpolation method, the picture quality for small displacement amplitudes can be visibly improved. However, as detailed examinations have shown, this motion adaptive interpolation is unsatisfactory for large displacement amplitudes because of the inaccuracy of the displacement estimator and segmentizer employed.

SUMMARY OF THE INVENTION

It is therefore an object of the present invention to effect an interpolation which is more reliable and more accurate.

It is a particular object of the invention to effect interpolation for large displacements without adversely affecting picture quality.

These and other objects are achieved, according to the present invention in a method for the motion adaptive interpolation of nontransmitted television image sequences, each based on at least two transmitted television image sequences, by receiving the transmitted sequences and segmentally dividing the received sequences into stationary and moving components, and determining the displacement of the moving components by picture elements, the improvement comprising: electronically segmentally dividing each sequence into background regions which are to become visible and background regions which are to become hidden due to the movement of each moving component and deriving characteristic segment information having four possible values; deriving a set of filter coefficients from the character segment information and from information obtained by said step of determining; and applying the filter coefficients to a motion adaptive interpolation filter for causing the filter to generate the nontransmitted image sequences.

The displacement estimation in the method according to the present invention is distinguished by very fast convergence even with large displacements but also other methods can be used.

The present invention will now be described in greater detail with reference to the drawings.

DESCRIPTION OF THE PREFERRED EMBODIMENTS

Figure 1:
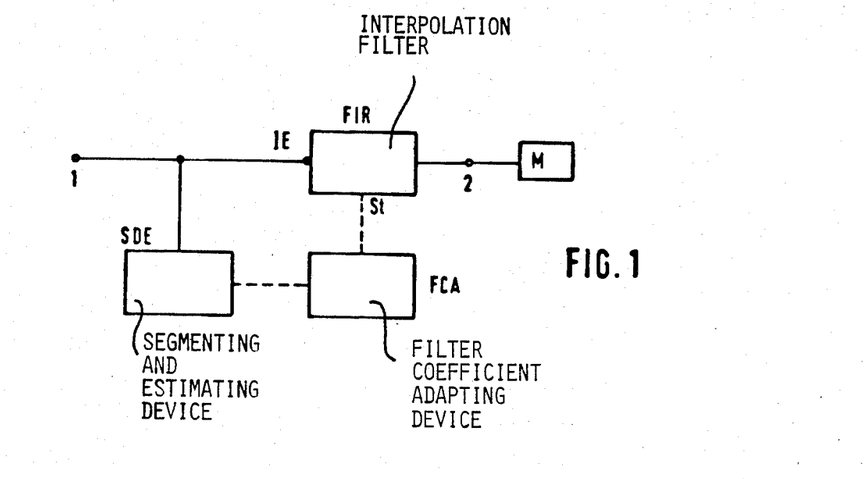
FIG. 1 is a block circuit diagram for a motion adaptive image interpolator according to the invention.

An embodiment of a receiving circuit operating according to the present invention is shown in FIG. 1 and serves to illustrate the principles of the invention. The motion adaptive interpolator is constructed to have three stages and is composed of a segmenting and displacement estimating device SDE, a filter coefficient adapting device FCA and a three-dimensional interpolation filter FIR. Television image sequences, i.e. digital video signals, are fed to input 1. These signals are evaluated by segmenting and displacement estimating device SDE as well as by interpolation filter FIR which supplies video signals via an output 2 to a playback monitor M. Interpolation filter FIR has a control input St which is connected with filter coefficient adapting device FCA. The input of filter coefficient adapting device FCA receives the output signals of segmenting and displacement estimating device SDE.

In the first stage, SDE, two transmitted television images, e.g. frames, are intermediately stored and divided, on the basis of suitable segmenting rules, into stationary components, moving components, background which becomes visible again due to the movement and background which is newly covered by the movement. Based on the segment information and the estimated displacement values, a suitable set of filter coefficients can be determined in the second stage FCA for each pixel to be interpolated. The third stage FIR determines, with the aid of the transmitted images, the luminance values of the images which were eliminated at the transmitting end in view of the use of an interpolator for reconstruction at the receiving end, or it determines additional images with the aid of the transmitted frames so as to increase the image frame rate on the monitor M at the receiving end. Each one of the additionally generated image sequences is displayed on playback monitor M between two transmitted image sequences shown in the standard manner. This makes possible the elimination of flicker in standard television transmissions.

For the interpolation of eliminated sequences or of additional sequences, a pixel rule for four distinguishable characteristic segment information values is required, with each segment having a specific set of associated filter coefficients.

Figure 2:
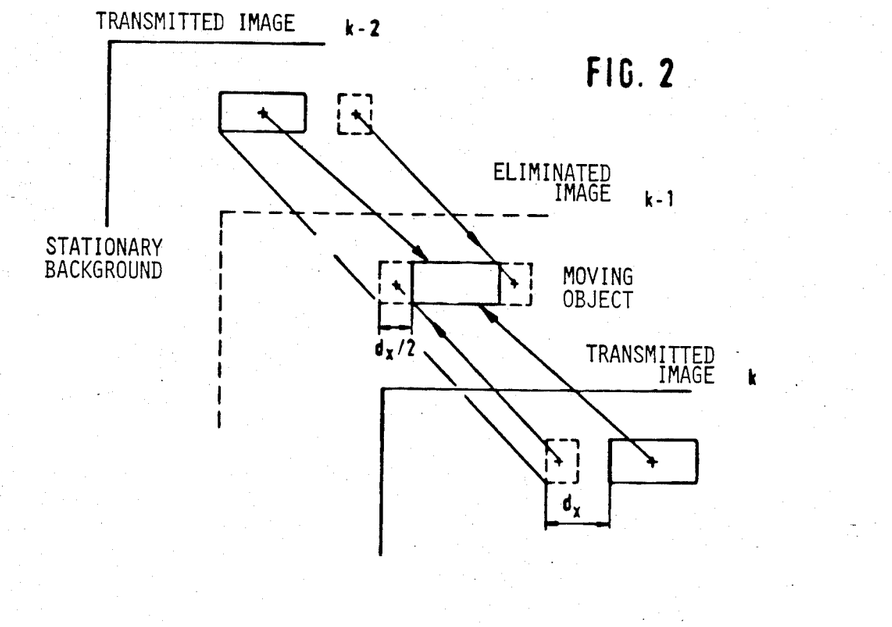
FIG. 2 is a diagram illustrating a motion dependent interpolation scheme according to the invention for various image segments.

FIG. 2 shows an example for this pixel rule in connection with three immediately successive image sequences, or fields, containing a moving object in front of a stationary background. The image information within sequence $k-1$ which was not transmitted, e.g. was eliminated at the transmitting end, is composed of the stationary background and a moving object which experienced a displacement $d_x/2$ relative to the immediately preceding sequence $k-2$. To the left of the moving object's outline, stationary background becomes visible which in sequence $k-2$ was still covered. To the right of the object's outline, background is still visible which will be covered in sequence $k$. To reconstruct eliminated sequence $k-1$, i.e. to additionally generate sequence $k-1$, each segment must be interpolated from the transmitted image sequences according to the marked arrows in FIG. 2.

Figure 3:
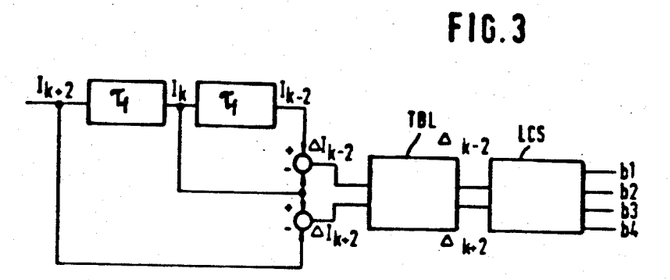
FIG. 3 is a block diagram of one embodiment of a circuit for picture segmentization according to the invention, forming part of the circuit of FIG. 1.

The method used for segmenting an image to be interpolated will now be described in greater detail with reference to the block circuit diagram of FIG. 3, which shows a part of an embodiment of device SDE. According to FIG. 3, the image luminance value differences $\Delta I_{k-2}$ and $\Delta I_{k+2}$, respectively, of the video signal are determined for three successive corresponding sequences, e.g. frames, $I_{k+2}$, $I_k$ and $I_{k-2}$, if every second frame is eliminated and when $\tau_f$ is a frame memory. These difference signals $\Delta I_{k-2}$ and $\Delta I_{k-2}$ are each fed to a threshold value and binary limiting stage TBL, which calculates $\Delta$ according to $$\Delta = \begin{cases} 1 \text{ if } \Delta I > \text{threshold} \\ 0 \text{ if } \Delta I < \text{threshold} \end{cases}$$

Two binary variables $\Delta_{k-2}$ and $\Delta_{k+2}$ are available at the output of TBL and furnish masks for the stationary and non-stationary regions within three image sequences.

In a subsequent combination stage LCS, the logic "AND" relationships $\Delta_{k-2}$ & $\Delta_{k+2} = b_1$ (moving object)

$\Delta_{k-2}$ & $\overline{\Delta_{k+2}} = b_2$ (background to be hidden)

$\overline{\Delta_{k-2}}$ & $\Delta_{k+2} = b_3$ (background being revealed)

$\overline{\Delta_{k-2}}$ & $\overline{\Delta_{k+2}} = b_4$ (stationary background)

are used to associate one of four previously defined characteristic image segments with each pixel. In the moving image segments, displacement is estimated with the aid of the following recursion formula for displacement $d_x$ $$d_{x(i)} = d_{x(i-1)} - 2 \frac{\sum\limits_w [I_{k-2}(x-d_x, y-d_y)_{(i-1)} - I_k(x,y)] \partial/\partial_x I_k(x,y)}{\sum\limits_w [\partial/\partial_x I_{k-2}(x-d_x, y-d_y)_{(i-1)} + \partial/\partial_x I_k(x,y)] \partial/\partial_x I_k(x,y)}$$

where w is a rectangular image window an i is a recursion step. Displacement $d_y$ for the vertical direction y is determined correspondingly. Also other displacement estimation methods can be used.

The above relationship for $d_{x(i)}$ is a recursion formula which always produces a new estimated value $d_{x(i)}$ from the immediately preceding estimated value $d_{x(i-1)}$ together with a correction value. In the first step, $d_{x(i)}$ is determined with $d_{x(i-1)}$ and in the second step $d_{x(i+1)}$ is determined with $d_{x(i)}$ from the first step, etc. Normally one to three iterations are required to get a displacemet estimate with sufficient accuracy for one pixel. The size of the image window is $W = N \times N$, where 2N should be greater than the maximum displacement.

The resulting displacement vector $d_x$ is derived by a factor of 2. The integer part of $d_x/2$ is added to x to give the input $A_1$ and $A_3$ in FIG. 6. The fractional part of $d_x/2$ gives the input for $E_1$ and $E_3$.

Figure 4:
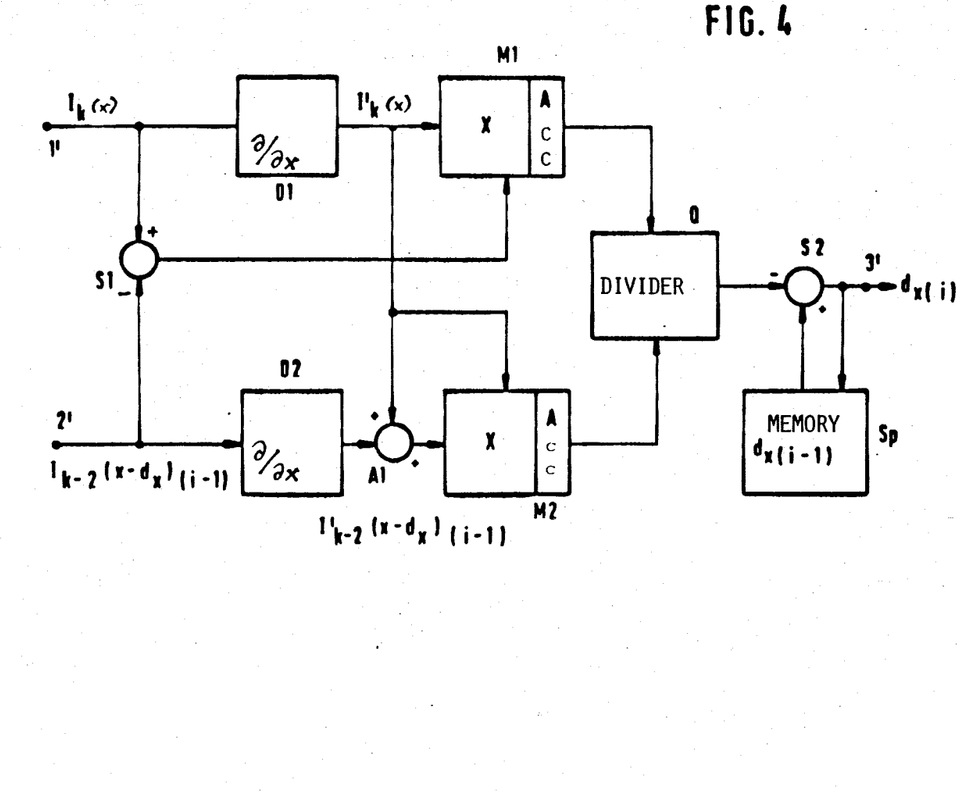
FIG. 4 is a block diagram of a one-dimensional circuit arrangement for displacement determination.

As can be seen in FIG. 4, the difference between the images $I_k(x)$ and $I_{k-2}(x-d_x)_{(i-1)}$ fed to signal inputs 1' and 2' is formed in subtracter S1. Both images $I_k(x)$ and $I_{k-2}(x-d_x)_{(i-1)}$ are passed through differantiators D1 and D2 which, at their outputs, provide the first order spatial derivatives of the images. Multipliers M1 and M2 are each equipped with an accumulation device Acc with which the multiplied signals are summed—in the illustrated embodiment this summing is effected with respect to an image window w. For multiplier M1, the signal fed to the first multiplying input is the output signal of differentiator D1 and the signal fed to the second multiplying input is the output signal of subtractor S1. Multiplier M2 receives the output signal of differentiator D1 as well as the output signal of an adder A1 which links the output signals of the two differentiators D1 and D2. The output signals of M1 and M2 are fed to a divider Q which weights the result of the division by a factor of 2. The actual estimated value $d_{x(i)}$ is obtained by means of subtracter S2 by linking the estimated value determined during the preceding recursion step, which is stored in a memory Sp, with the current correction value, which is the output signal of divider Q. For storing the determined estimated value, memory Sp is provided with a connection to output 3' of subtracter S2, which output is also the output of the arrangement. To take care that signals $I_k(x)$ and $I_{k-2}(x-d_x)_{(i-1)}$ can be evaluated together, a signal delaying device (not shown) is connected ahead of signal input 1' of the arrangement so as to delay the luminance signal $I_k(x)$ by the duration of two fields, i.e. one frame.

A theoretical and experimental analysis shows that this estimated displacement value determination has improved convergence and greater accuracy than other estimation methods.

The above described determination is described in greater detail in our copending U.S. application entitled METHOD FOR DETERMINING THE DISPLACEMENT OF IMAGE SEQUENCES AND ARRANGEMENT AS WELL AS USES FOR IMPLEMENTING THE METHOD and claiming priority rights of Federal Republic of Germany Application No. P 34 08 016.3 of Mar. 5, 1984.

Figure 5:
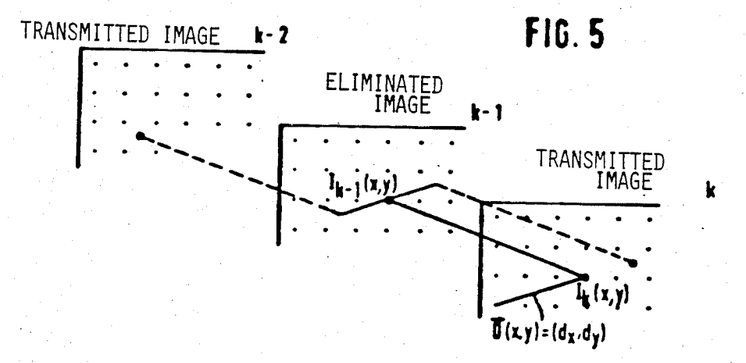
FIG. 5 is a diagram illustrating displacement vector assignment within moving image regions.
Figure 7:
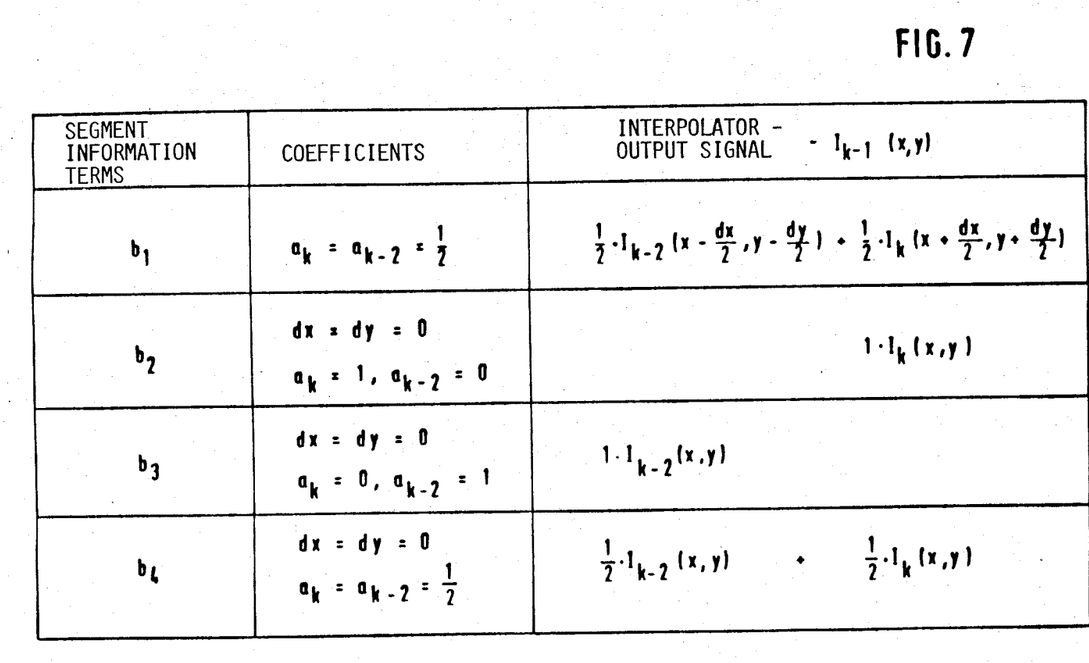
FIG. 7 is a table for adapting filter coefficients for circuits according to the invention.

Corresponding to the segment information and the estimated displacement values for each pixel, a specific set of filter coefficients is determined in stage FCA of FIG. 1 for the multi-dimensional (space and time) interpolation filter FIR. FIG. 5 illustrates the assignment of a measured displacement vector in the case of pixels depicting a moving object. Here luminance signal $I_{k-1}(x,y)$, which is part of the moving region, is to be interpolated from image fields $k-2$ and k. The displacement estimate at point (x,y) is measured only for image field k and not for image field $k-1$. For simplification this displacement estimate D is also assigned to point (x,y) in field $k-1$. The interpolated luminance value is then determined by the following relationship:

$$I_{k-1}(x,y) = a_{k-2}(x - d_x/2, y - d_y/2) \cdot I_{k-2}(x - d_x/2, y - d_y/2) +$$
$$a_k(x + d_x/2, y + d_y/2) \cdot I_k(x + d_x/2, y + d_y/2)$$

with the coefficients according to FIG. 7, e.g.:

$$a_{k-2}(x-d_x/2, y-d_y/2) = \tfrac{1}{2}$$

$$a_k(x+d_x/2, y+d_y/2) = \tfrac{1}{2}$$

for an image segment $b_1$.

In the case of displacements that are not integer numbers, (for example D=1.7 pixels), the luminance (or chrominance) values $I_{k-2}(x-d_x/2, y-d_y/2)$ and $I_k(x+d_x/2, y+d_y/2)$ are interpolated values which can be obtained by bilinear interpolation with evaluation of four adjacent pixel luminance values. If more than one image field was eliminated, the displacement weighting factors of $a_k$ and $a_{k-2}$ in the equation for $I_{k-1}(x,y)$ must be chosen to correspond to the time intervals between the transmitted images. This will be described in further detail below.

For a stationary background $b_4=1$, the luminance values are determined by linear interpolation, e.g.:

$$a_{k-2}(x,y) = \tfrac{1}{2}$$

$$a_k(x,y) = \tfrac{1}{2}$$

In image regions which are part of segments in the image to be interpolated which belong to background being revealed $b_2=1$ or background to be hidden $b_3=1$, the segment informations as well as the estimated displacement values must be taken into consideration to obtain an accurate reconstruction and interpolation. Since the determined segment of "background going to be hidden" is measured only for image sequence k and not for image sequence $k-1$, which must be interpolated, as additional distinction has to be made with the help of the estimated displacement values. If a displacement vector derived by 2 ends in the segment of "background going to be hidden", the associated pixel of sequence k is considered as belonging to the segment for "background going to be hidden." The associated pixel can be reconstructed, or generated, respectively, by means of the coefficients $$a_{k-2}(x,y) = 1$$

$$a_k(x,y) = 0$$

Otherwise, the displacement vector ends within the moving region and the associated pixel is determined to belong to the moving region. For the segment of "background going to be visible", a similar decision making process is used.

Figure 5A:
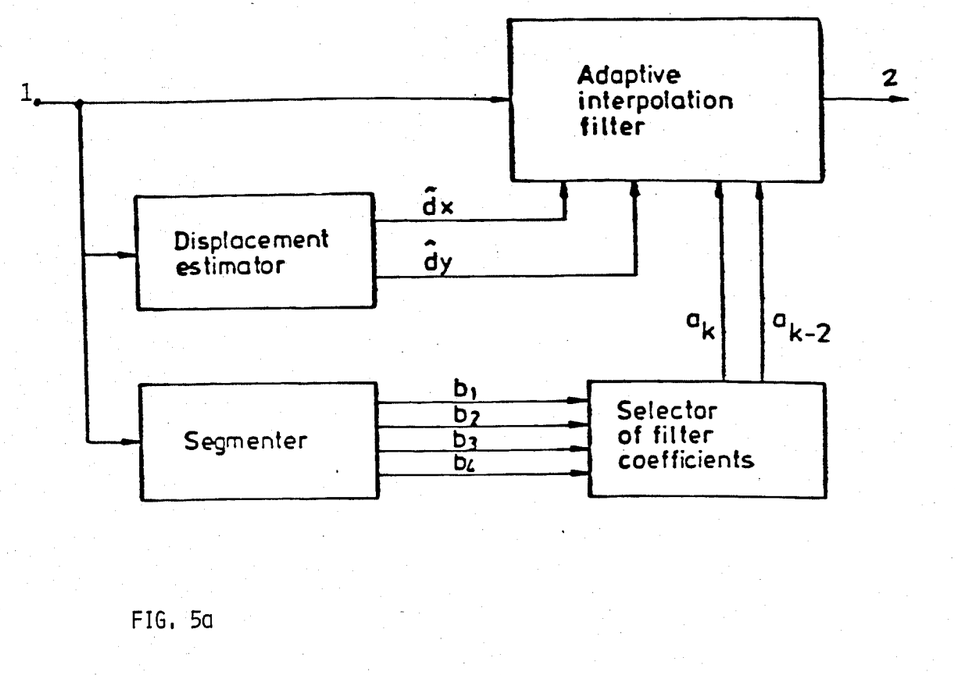
FIG. 5a is a detailed block diagram of the motion adaptive interpolator.

FIG. 5a shows a more detailed block diagram of the motion adaptive interpolator shown in FIG. 1. The segmenting and displacement estimating device SDE includes the segmenter shown in FIG. 3 to which the successive corresponding sequences at the input 1 are fed and which produces the four output signals $b_1$, $b_2$, $b_3$ and $b_4$ for the filter coefficient adapting device FCA. The sequences at the input 1 are also fed to the displacement estimator. There displacement is estimated for the x- and y-direction by using two of the one-dimensional circuit arrangements shown in FIG. 4. The two output signals dx and dy of the displacement estimator DE are then fed to the adaptive interpolation filter FIR described in more details in connection with FIG. 6.

Figure 6:
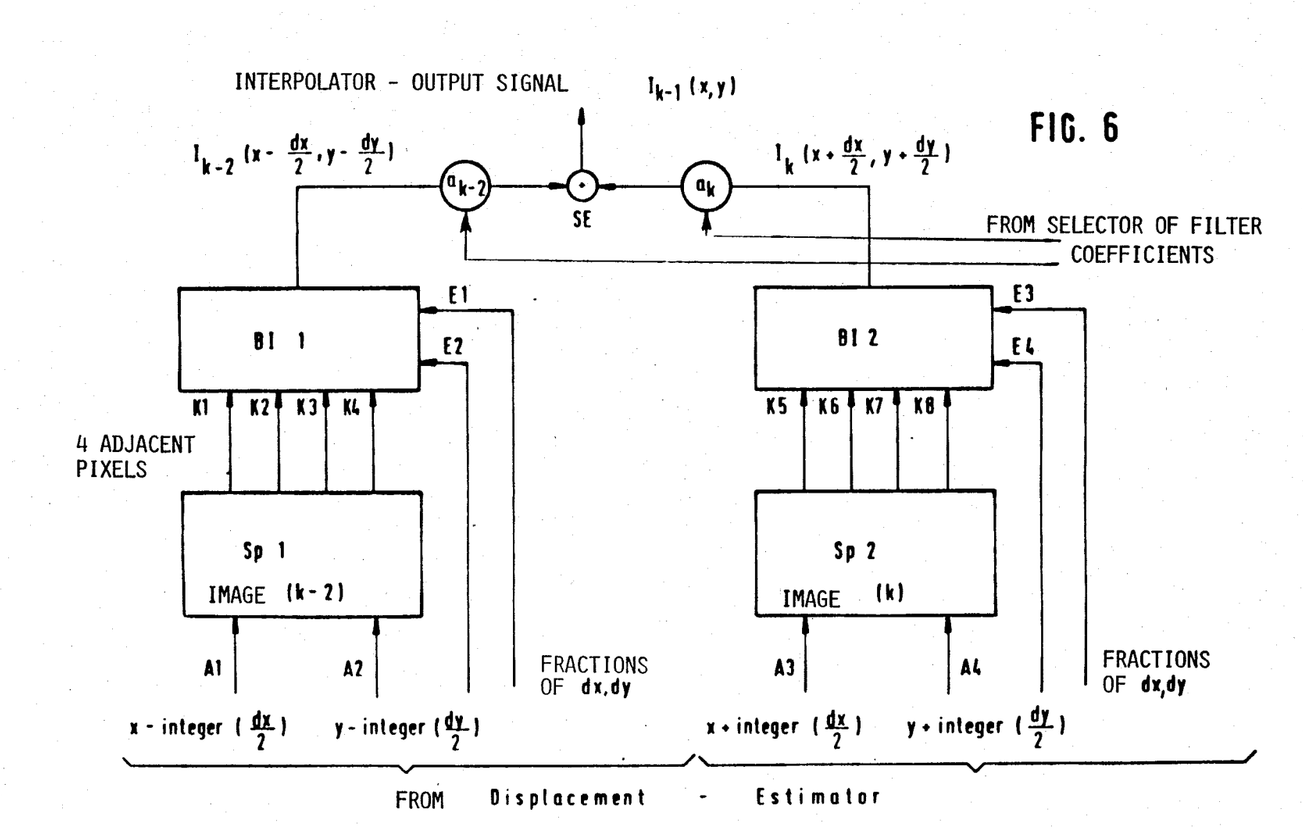
FIG. 6 is a block circuit diagram of one embodiment of an interpolation filter usable in the circut of FIG. 1.

FIG. 6 is a block circuit diagram of one preferred embodiment of the motion adaptive interpolator, or interpolation filter, FIR. This circuit includes two memories Sp1 and Sp2, one for each image field $k-2$ and k. By way of address inputs A1, A2 and A3, A4, respectively, these memories receive representations of the pixel location (x,y) plus or minus half the estimated value at the output of the displacement estimator; in each case, this is a whole number estimated value for the estimate in the x direction—A1 and A3—and in the y direction—A2 and A4. Each of two bilinear space interpolators—B11 for image field $k-2$ and B12 for image field k—receives representations of four adjacent pixels from memories Sp1 and Sp2, respectively, via inputs K1 through K8.

Via inputs E1 through E4, interpolators B11 and B12 each receive the fractions dx and dy of the estimated displacement values, which remained unconsidered for the whole number estimated displacement values applied to inputs A1 to A4. Interpolators B11 and B12 determine, from the respective four adjacent pixels and from fractions dx, dy, the luminance (or chrominance) value at the end of the displacement vector as described by Metravali et al, supra.

These signals $$I_{k-2}\left(x - \frac{dx}{2}, y - \frac{dy}{2}\right) \text{ and}$$

$$I_k\left(x + \frac{dx}{2}, y + \frac{dy}{2}\right)$$

are weighted in the associated coefficient evaluators $a_{k-2}$ and $a_k$ according to the table in FIG. 7, in which the segment information terms $b_1$ and $b_4$ are incorporated as explained above.

The coefficient weighted signals are summed by means of summing device SE so that the interpolated pixel $I_{k-1}(x,y)$ is available at the output of the interpolator for display on monitor M. The various interpolation signals $I_{k-1}(x,y)$ associated with corresponding segment information terms $b_i$ are also shown in the table of FIG. 7.

The block circuit diagram of the motion dependent interpolator of FIG. 6 and the table of FIG. 7 for determining the filter coefficients show the filter setting for the case where every other image field is transmitted from a transmitting end. If only every $n^{th}$ image field is transmitted and the $m^{th}$ image field ($m = 1, 2, \ldots n-1$) is interpolated, the coefficients $a_k$ and $a_{k-2}$ must be set as follows for segment information terms $b_1$, $b_4$:

$$a_{k-2} = \frac{n-m}{n} \quad a_k = \frac{m}{n}$$

For image segments $b_2$, $b_3$ the coefficients are the same as in FIG. 7.

In addition to reconstruction of images eliminated during transmission and removal of flicker in standard television images, the method according to the present invention can also be employed for the suppression of noise in the playback of transmitted or recorded television signals, for example by means of videorecorders. By knowing the direction of displacement vector D, the recorded signal can be filtered directly in this direction by means of motion adaptive interpolation filter FIR and can thus be substantially freed of noise signals without distortion of moving objects during playback.

It will be understood that the above description of the present invention is susceptible to various modifications, changes and adaptations, and the same are intended to be comprehended within the meaning and range of equivalents of the appended claims.

What is claimed is:

1. In a method for the motion adaptive interpolation of nontransmitted television image sequences, each based on at least two transmitted television image sequences, by receiving the transmitted sequences and segmentally dividing the received sequences into stationary and moving components, and determining the displacement of the moving components by picture elements, the improvement comprising: electronically segmentally dividing each sequence into background regions which are revealed and background regions which are to become hidden due to the movement of each moving component and deriving characteristic segment information having four possible values; deriving a set of filter coefficients from the character segment information and from information obtained by said step of determining; and applying the filter coefficients to a motion adaptive interpolation filter for causing the filter to generate the nontransmitted image sequences.

2. A method as defined in claim 1 wherein said step of determining is carried out: by recursively deriving estimated displacement values, each value being derived by combining a correction value with the previously derived estimated displacement value; and by deriving the correction value by a mathematical division operation in which the divisor is the average of a first value obtained by cross-correlation of the currently received image sequence with a previously received image sequence, and a second value obtained by autocorrelation of the currently received image sequence.

3. A method as defined in claim 1 wherein the nontransmitted image sequences are reconstructions of image sequences previously eliminated from the transmitted sequences.

4. A method as defined in claim 3, carried out for removing flicker during playback of standard television images by increasing the image repetition rate in that the generated image sequences are displayed on a playback monitor between the transmitted image sequences, displayed in the standard manner.

5. A method as defined in claim 1 wherein the interpolated image sequences form a new image sequence with a converted standard with an image repetition rate which is different from the input image sequence.

6. A method as defined in claim 1 for the suppression of noise during playback of transmitted television image sequences.

7. A method as defined in claim 6 wherein the transmitted sequences are transmitted from a videorecorder.

8. A circuit arrangement including a motion adaptive interpolator for generating television image sequences from transmitted image sequences depicting a scene, each generated sequence being derived from at least two transmitted sequences and being inserted, at a video display terminal, between two of the transmitted sequences from which it is derived, said circuit arrangement being constructed to generate an output signal containing successive representations of successive picture elements of an image sequence being generated, with each picture element being representative of an element of the scene depicted by the transmitted sequences, and further comprising means for deriving, from transmitted image sequences, indications relating to the locus, on the associated image, of each successive picture element of a sequence being generated, which indications include a first set of locus indications representative of the difference between the locus of each picture element of the sequence being generated and the integral number of picture element positions in an estimated displacement of the scene element represented by that picture element between the sequence being generated and a transmitted sequence from which that sequence is being generated, and a second set of locus indications representative of the addition of the locus of each picture element of the sequence being generated and such integral number of picture element positions; and said interpolator comprising:

a first image sequence memory connected to receive and store representations of the picture elements of a transmitted image sequence from which an image sequence is being generated and which precedes the image sequence being generated, said first image sequence memory having address inputs connected to receive the first set of locus indications and four data outputs for supplying representations of respective ones of four successive picture elements of the transmitted image sequence stored in said first memory;

a second image sequence memory connected to receive and store representations of the picture elements of a transmitted image sequence from which the image sequence is being generated and which follows the image sequence being generated, said second image sequence memory having address inputs connected to receive the second set of locus indications and four data outputs for supplying representations of respective ones of four successive picture elements of the transmitted image sequence stored in said second memory;

first and second bilinear interpolators each having four data inputs connected to said four data outputs of a respective one of said image sequence memories, two additional inputs connected to receive indications of any fractional part of each estimated displacement, and an output for supplying representations of a characteristic of each picture element of a sequence being generated;

two controllable coefficient evaluators each having a data input connected to said output of a respective one of said bilinear interpolators, a control input connected to receive an indication of the movement being experienced by the scene element depicted by each picture element of the image sequence being generated, and an output for supplying representations of the representations applied to its associated data input in dependence on the indications applied to its associated control input; and summing means having summing inputs connected to said outputs of said coefficient evaluators and an output for providing a signal constituting the image sequence being generated.

* * * * *